United States Patent [19]
Clark

[11] 3,972,952
[45] Aug. 3, 1976

[54] VAPOR-PHASE CONVERSION OF METHANOL AND ETHANOL TO HIGHER LINEAR PRIMARY ALCOHOLS BY HETEROGENEOUS CATALYSIS

[75] Inventor: Roger T. Clark, Corpus Christi, Tex.

[73] Assignee: Celanese Corporation, New York, N.Y.

[22] Filed: Mar. 14, 1975

[21] Appl. No.: 558,524

[52] U.S. Cl. .................... 260/642 R; 252/466 PT
[51] Int. Cl.² ........................................ C07C 29/00
[58] Field of Search ................... 260/642 B, 642 C

[56] References Cited
UNITED STATES PATENTS

| | | | |
|---|---|---|---|
| 2,050,788 | 8/1936 | Fuchs et al. | 260/642 C |
| 2,836,628 | 5/1958 | Miller | 260/642 C |
| 3,285,948 | 11/1966 | Butter | 260/642 B |

FOREIGN PATENTS OR APPLICATIONS

| | | | |
|---|---|---|---|
| 1,177,233 | 1/1970 | United Kingdom | 260/642 C |

*Primary Examiner*—Joseph E. Evans
*Attorney, Agent, or Firm*—Charles E. Miller

[57] ABSTRACT

A solid catalyst composition for the vapor phase conversion of methanol and ethanol to higher linear primary alcohols (e.g., n-propanol) is made up of particles of an inert, high surface area support (e.g., gamma-aluminum oxide) impregnated with an inorganic base promoter (e.g., a basic salt of an alkali metal) and a platinum group metal (e.g., rhodium). The production of the higher linear primary alcohols is carried out by contacting a mixture of methanol, ethanol, and a carrier gas (e.g., synthesis gas) with the catalyst at a temperature of between 200° and 400°C. and pressure of between 1000 and 5000 p.s.i.g. at a space velocity of between 2000 and 10,000 hr$^{-1}$.

11 Claims, No Drawings

VAPOR-PHASE CONVERSION OF METHANOL AND ETHANOL TO HIGHER LINEAR PRIMARY ALCOHOLS BY HETEROGENEOUS CATALYSIS

BACKGROUND OF THE INVENTION

This invention relates to the vapor phase production of aliphatic alcohols by heterogeneous catalysis. More particularly, it relates to a novel solid catalyst composition and the process for using the catalyst to convert methanol and ethanol in the vapor phase to higher linear primary alcohols.

Numerous attempts have been made in the past to develop a commercially viable process for converting readily available lower alcohols to more valuable higher linear primary alcohols which are presently in great demand as commodity chemicals.

These efforts were generally directed at developing the so-called Guerbet synthesis, a heterogeneous catalysis reaction whereby a primary or secondary alcohol containing a methylene group alpha to the carbinol moiety is condensed with itself or with a different alcohol likewise containing the aforesaid methylene group to form a higher alcohol containing twice the number of carbon atoms of the single starting alcohol, or, in the case of mixed starting alcohols, the sum of the number of carbon atoms in each reacting pair of alcohols. For example, ethanol can be self-condensed to form n-butanol while a mixture of ethanol and n-propanol can be condensed to form n-butanol, 2-methylpentanol, n-pentanol, and 2-methylbutanol.

Heretofore, much of the development work or improving the Guerbet reaction has been centered on the nature of the catalyst system. Thus, in U.S. Pat. No. 2,762,847, there is disclosed the use of catalysts composed of alkali or alkaline earth metal phosphates, particularly ortho- and pyrophosphates. U.S. Pat. No. 2,971,033 discloses the use of a mixture of potassium carbonate, magnesium oxide and copper chromite to effect the Guerbet reaction, while U.S. Pat. No. 3,479,412 teaches that the conversion will proceed in the presence of catalysts made up of soluble compounds of metals of the platinum series (e.g., rhodium, palladium) and ligands selected from the group consisting of organic compounds of trivalent phosphorus, arsenic and antimony.

A somewhat different method than the Guerbet synthesis for making higher alcohols is the so-called oxo reaction or hydroformylation of olefins whereby carbon monoxide and hydrogen are added across the double bond in the pressure of a catalyst to form the alcohol functionality. Typical of catalyst systems which are useful in this approach to higher alcohols are those described in U.S. Pat. No. 3,239,570 which suggests that metals of Group VII B (e.g., manganese) or Group VIII (e.g., rhodium) of the Periodic Table of the Elements can be complexed with carbon monoxide and a tertiary organic arsine to give a catalyst which effects the desired transformations. For a more generalized treatment of the oxo synthesis as applied to the preparation of higher alcohols, see P. H. Emmett, ed., *Catalysis*, vol. V, pages 73–130 (Reinhold, New York 1957).

In yet another technique for synthesizing higher alcohols from lower ones, U.S. Pat. No. 3,387,043 teaches that Cn alcohols can be made from Cn-1 alcohols by homologation using hydrogen and carbon monoxide in the presence of soluble cobalt compounds as catalyst.

Notwithstanding the variety and extent of previous investigations into the synthesis of alcohols from lower alcohols and olefins, there has heretofore been no commercially successful procedure for the one-step conversion of such simple and cheap starting materials as methanol and ethanol into more valuable products such as n-propanol and n-butanol. Chief among the reasons for this has been the failure of previous heterogeneous catalyst formulations to withstand the elevated temperatures and pressures inherent in these processes without loss of catalyst activity in a short period of time. For example, it is known that so-called methanol synthesis catalysts such as the potassium carbonate-doped CuO/ZnO system are effective in converting carbon monoxide and hydrogen to methanol. However, when these catalysts are applied to the synthesis of higher alcohols, they invariably undergo rapid ageing with consequent loss in catalytic activity and selectivity to linear primary alcohols. As a result, these catalysts, when applied to the conversion of, say, methanol and ethanol to higher alcohols, usually have an effective life of but a few hours, which is too short to justify their employment in commercial continuous processes. For a general discussion of the use of methanol synthesis catalysts to make higher n-alcohols and the problems associated therewith, see U.S. Pat. No. 1,770,165, U.S. Pat. No. 1,910,582, and P. H. Emmet, ed., *Catalysis*, vol. V, pages 131–174 (1957).

A long felt need has therefore existed in chemical industry for a catalyst system and a process for using same to facilitate the conversion of relatively cheap starting materials, such as methanol and ethanol, to more valuable product alcohols of the linear primary type without degrading the activity or selectivity of the catalyst even after prolonged continuous use at elevated temperature and pressure.

Accordingly, it is an object of the invention to provide a catalyst system for the conversion of lower alcohols selectively to higher, linear primary alcohols which possesses a high degree of longevity and resistance to degradation in catalytic activity and selectivity.

Another object is to provide an improved process for the selective conversion of lower alcohols to higher, linear primary alcohols under conditions of hetergeneous catalysis which can be operated continuously for extended periods of time without substantial degradation in catalyst activity or selectivity.

These and other objects of the invention, as well as a fuller understanding of the advantages thereof can be had by reference to the following detailed description and claims.

SUMMARY OF THE INVENTION

The foregoing objects are achieved according to the present invention by the discovery that alcohols having the molecular formula $C_nH_{2n+1}OH$ wherein $n$ is a positive integer, and particularly methanol and ethanol, are conveniently and rapidly converted to higher linear primary alcohols such as n-propanol and n-butanol by passing a vapor phase mixture of lower alcohol and carrier gas over a novel catalyst composition. The catalyst comprises solid particles of an inert, high surface area support material which has been impregnated with an oxide, hydroxide, or basic salt of an alkali or alkaline earth metal (inorganic base promoter) and with a metal of Periods 5 and 6 in Group VIII of the Periodic Table of the Elements ("platinum group metal").

THE CATALYST COMPOSITION

The solid catalyst composition of the present invention is made up of solid particles of an inert, high surface area support material impregnated with inorganic base promoter and platinum group metal so that the support material constitutes between about 85 and 97 percent by weight of the total catalyst composition while the promoter and platinum group metal constitute, respectively, between about 2 and 14 percent by weight and between 0.1 and 1 percent by weight of the total composition. Preferably, the support material amounts to between about 92 and 95 percent, the inorganic base promoter amounts to between about 4.5 and 7.5 percent, and the platinum group metal amounts to between 0.1 and 0.5 percent by weight of the total catalyst composition.

The particles of support material suitable for use in the present invention can have an irregular, spherical, pelleted, or any other convenient shape consistent with high particle surface area and are generally between about 5 and 30 Tyler mesh size, and desirably between about 10 and 20 Tyler mesh. Preferably, the catalyst support particles are of commercially available basic activated alumina or gamma-aluminum oxide ($\gamma$-$Al_2O_3$). This material, which has been found to possess satisfactory particle surface area (usually ranging from about 100 to 400 square meters per gram) and stability under conditions of impregnation and vapor phase catalysis described hereinbelow, is described in detail in Kirk-Othmer, *Encyclopedia of Chemical Technology*, 2d ed., vol. 2, pages 51–54 (1963). Other inert, high surface area support materials will suggest themselves to those skilled in the catalyst art.

The inorganic base promoter which forms an essential component of the catalyst composition of the present invention consists of one or more oxides, hydroxides, or basic salts of alkali metals (e.g., sodium, potassium, rubidium) or alkaline earth metals (e.g., magnesium, calcium, strontium). An example of a suitable oxide is magnesium oxide. Examples of hydroxides of alkali and alkaline earth metals include sodium hydroxide and potassium hydroxide. Examples of basic salts of alkali and alkaline earth metals are potassium phosphate, potassium carbonate, rubidium acetate and calcium carbonate. In the practice of the present invention, the basic salts of alkali metals are preferred for use as the inorganic base promoter component of the catalyst composition, with rubidium acetate being especially preferred because of its high activity.

The platinum group metal component of the catalyst composition is understood to include one or more of the noble metals of Periods 5 and 6 in Group VIII of the Periodic Table of the Elements, i.e., ruthenium, rhodium, palladium, osmium iridium and platinum. Preferably, the catalyst is formulated to contain as the platinum group metal one or more of the elements ruthenium, rhodium and palladium, with rhodium and palladium being especially preferred.

In making the novel catalyst composition of the invention, the solid inert support material of appropriate particle size and quantity is impregnated with inorganic base promoter and platinum group metal with the aid of a convenient inert vehicle which can be later volatilized, such as water. Desirably, the impregnation with platinum group metal and base promoter is performed sequentially, for example, by first contacting the particles of support material with a solution of platinum group metal precursor and then with a solution of inorganic base promoter or precursor thereof. The percentage composition of the catalyst composition can be conveniently determined at this point by appropriate adjustment of the concentrations of these solutions. For example, water soluble salts of platinum group metals such as palladium acetate and rhodium nitrate can be employed and later (after the impregnation operation has been completed) transformed into the free metal by heat or reduction, e.g., in an atmosphere of hydrogen. The impregnation of the catalyst support with base promoter can be accomplished, in the case of basic salts of alkali or alkaline earth metals, by means of the salt itself or by using an aqueous solution of the corresponding alkali or alkaline earth metal hydroxide which is then neutralized in situ with the appropriate weak acid to form the corresponding desired basic salt. For example, the catalyst support can be covered with an aqueous solution of an alkali metal hydroxide such as rubidium hydroxide which is then neutralized with an appropriate amount of weak acid, such as acetic acid.

After the impregnation of the support material has been completed, the resulting catalyst composition is evaporated to dryness, preferably in an inert atmosphere or at reduced pressure, and then heated, for example, in a reducing atmosphere such as hydrogen, at an elevated temperature, of between about 150° and 400°C. for a period of time (usually several hours will suffice) until the platinum group metal precursor on the catalyst support has been converted to elemental form.

THE SYNTHESIS OF HIGHER LINEAR PRIMARY ALCOHOLS

In the conversion of lower alcohols having the formula $C_nH_{2n+1}OH$, wherein $n$ is a positive integer, to higher linear primary aliphatic alcohols according to the process of the present invention, it has been found that when the lower alcohol starting material is a mixture of methanol and ethanol (i.e., where $n$ is equal to 1 and 2 in the aforesaid formula), an unusually high yield of n-propanol together with lesser amounts of n-butanol is obtained. The process conditions under which this conversion takes place using the above-described catalyst compositions are extraordinarily mild for reactions of this type, and since the product alcohols can be easily separated by conventional fractionation procedures, the present process represents an attractive route from the readily available and cheap starting materials methanol and ethanol to relatively higher linear primary alcohols such as n-propanol which are valuable industrial products in their own right.

In practicing the method of the invention, it is desirable to employ a continuous flow process in which a feed blend of methanol and ethanol in a weight ratio of between about 1:1 and 5:1 is formed into a vapor phase mixture with a carrier gas which can be an inert diluent, such as nitrogen, or a chemically reactive component of the system as described below. The feed blend/carrier gas mixture is then contacted with the solid catalyst composition at a temperature of between about 200° and 500°C. and at a pressure of between 1000 and 5000 p.s.i.g. The amount of catalyst employed in the reactor and the rate at which the feed blend/carrier gas mixture is contacted therewith are adjusted to give a space velocity of between 2000 and 10,000 $hr^{-1}$. The exit gases from the reactor can be condensed and the desired higher alcohol isolated or fractionated by conventional separation procedures. Alternatively, the hot exit gases can be fractionated directly. Unreacted MeOH and EtOH can be recovered and recycled.

In a preferred mode of carrying out the present process, a feed blend of methanol and ethanol in a weight ratio of between 2:1 and 4:1 is mixed with a carrier gas comprising hydrogen, a particularly preferred carrier gas being a mixture of hydrogen and carbon monoxide of the type known as "synthesis gas" wherein the molar ratio of hydrogen to carbon monoxide ranges from 1:2 to 6:1. The feed blend/carrier gas mixture is contacted with the preferred catalyst of the invention which is made up of 10 to 20 Tyler mesh particles of the general formula:

$$[\gamma-Al_2O_3]_{92-95}[RbOAc]_{4.5-7.5}[M]_{0.1-0.5}$$

wherein M represents rhodium, palladium or ruthenium and the subscripts are weight percentages of the total catalyst composition. The feed gases and catalyst are maintained at a temperature of between about 300° and 400°C. while the reaction system, which can be contained in a tube-type reactor of conventional design, is maintained at a pressure of between about 1000 and 1500 p.s.i.g. By conducting the reaction at space velocities of between about 2000 and 10,000 hr$^{-1}$ space-time yields of 100–120 g/l/hr are readily obtained, and the product alcohols typically comprise about 70 percent by weight n-propanol and 10 percent n-butanol, with concurrent formation of very small amounts of iso-butanol.

Without wishing to be bound by theory, it is believed that higher alcohols of three or more carbon atoms are derived from ethanol and methanol in the present process by a sequence of steps involving dehydrogenation, aldol condensation, and hydrogenation according to equations (1) through (4) as follows:

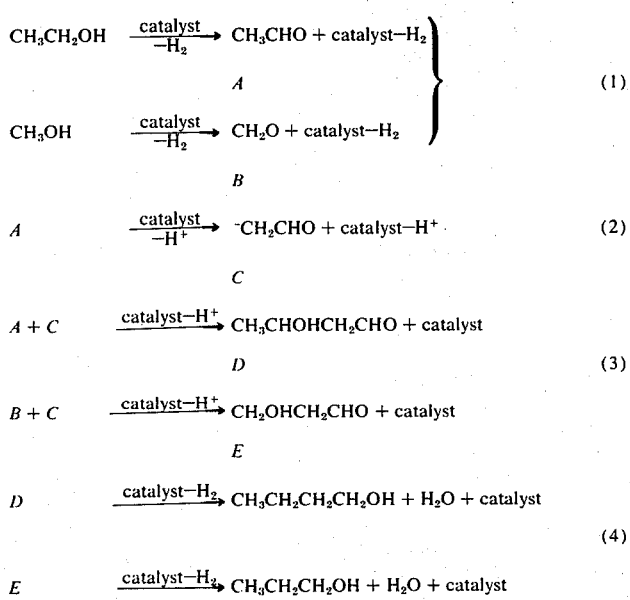

The foregoing transformations are facilitated as shown by the catalyst compositions of the present invention to give the higher alcohols n-propanol and n-butanol from ethanol and methanol. The inorganic base promoter component of the catalyst is believed to increase the rate of the aldol condensation reactions (2) and (3) while the platinum group metal component is believed responsible for favorable kinetics in the dehydrogenation and hydrogenation reactions (1) and (4). Furthermore, it is believed that the superior results achieved when using mixtures of hydrogen and carbon monoxide as the carrier gas are due, at least in part to the desirable shifting of the methanol/synthesis gas equilibrium in favor of methanol formation as shown in equation (5) and also to the tendency of methanol to form ethanol as depicted in equation (6):

$$CH_3OH \rightleftharpoons CO + 2H_2 \tag{5}$$

$$CH_3OH + CO + 2H_2 \rightarrow CH_3CH_2OH + H_2O \tag{6}$$

The overall conversion of the present process can be carried out continuously at the necessary elevated temperatures using conventional flow-through reactor techniques for long periods of time without substantial diminution of catalyst activity or product yield, even after 300 hours continuous operation, which in turn leads to the achievement of attractive process economics.

DESCRIPTION OF PREFERRED EMBODIMENTS

The following examples illustrate the novel solid catalyst compositions and process for producing linear primary aliphatic alcohols according to the present invention. All parts, concentrations, ratios and percentages are by weight unless otherwise indicated.

EXAMPLE I

A quantity (23.5 parts) of 10–20 Tyler mesh activated alumina is placed in a flask fitted for vacuum impregnation. The alumina is wetted with a solution of 0.1514 part of ruthenium nitrate, Ru(NO$_3$)$_3$, in 1.3 parts of water. The water is removed under vacuum and the residue is further impregnated with an aqueous solution of rubidium acetate, Rb(OAc), prepared by adding 0.60 part of glacial acetic acid and 1 part of RbOH to 10 parts of water to which is then added an additional quantity of RbOH until the solution is strongly basic to litmus paper.

The water is removed from the impregnated catalyst material under vacuum and the material is reduced in an atmosphere by hydrogen for 2 hours at 400°C.

The resulting catalyst contains approximately 92.7 percent $Al_2O_3$, 7.0 percent RbOAc, and 0.25 percent Ru and may be represented by the following formula: $[\gamma\text{-}Al_2O_3]_{92.7}[RbOAc]_{7.0}[Ru]_{0.25}$.

EXAMPLE II

A quantity (23.5 parts) of 10–20 Tyler mesh activated alumina is placed in a flask fitted for vacuum impregnation. The catalyst support is then successively impregnated with rhodium nitrate and rubidium acetate by adding, first, a solution of 0.1514 part of $Rh(NO_3)_3$ in 13 parts of water followed by 1.05 part of RbOH and 0.6038 part of glacial acetic acid. The resulting product is dried overnight in an atmosphere of nitrogen at 150°C.

The catalyst composition is composed approximately 92.7 percent $Al_2O_3$, 7.0 percent RbOAc, and 0.25 percent Rh and may be represented by the following formula: $[\gamma\text{-}Al_2O_3]_{92.7}[RbOAc]_{7.0}[Rh]_{0.25}$.

EXAMPLE III

A quantity (22.7 parts) of 10–20 mesh activated alumina is placed in a flask fitted for vacuum impregnation. The alumina catalyst support material is successively impregnated with 0.15 part of palladium acetoacetonate and 1.5 part of rubidium acetate in appropriate solvents which are removed under vacuum. The catalyst support is reduced in a hydrogen atmosphere at 400°C. for 2 hours.

The resulting catalyst contains approximately 92.7 percent $Al_2O_3$, 7.0 percent RbOAc, and 0.25 percent Pd and may be represented by the following formula: $[\gamma\text{-}Al_2O_3]_{92.7}[RbOAc]_{7.0}[Pd]_{0.25}$.

EXAMPLE IV

A 3:1 mixture of methanol and ethanol is passed over the catalyst prepared in Example I at a rate of 6.0 grams per hour together with a carrier gas composed of 1000 milliliters per minute of nitrogen and 100 milliliters per minute of hydrogen. The system is maintained at a temperature of 361°C. and a pressure of 1000 p.s.i.g.

The reaction product is obtained at the rate of 5.1 grams per hour (space time yield ($C_3$–$C_4$) = 17.3 grams/liter/hour) and is composed of n-butanol (0.4 percent), n-propanol (3.0 percent), ethanol (23.5 percent), methanol (68.9 percent), and water (4.2 percent).

EXAMPLE V

A 3:1 mixture of methanol and ethanol is passed over the catalyst prepared in Example II at the rate of 20.9 grams per hour together with a carrier gas composed of 700 milliliters per minute of hydrogen and 200 milliliters per minute of carbon monoxide. The system is operated at a temperature of 384°C. and a pressure of 1400 p.s.i.g.

The reaction product is obtained at the rate of 17.6 grams per hour (space time yield ($C_3$–$C_4$) = 118 grams/liter/hour) and is composed of n-butanol (1.1 percent), n-propanol (5.6 percent), ethanol (22.2 percent), methanol (66.6 percent) and water (4.5 percent).

EXAMPLE VI

A 3:1 mixture of methanol and ethanol is passed over the catalyst prepared in Example III at the rate of 20.9 grams per hour together with a carrier gas composed of 700 milliliters per minute of hydrogen and 200 milliliters per minute of carbon monoxide. The operation is conducted at a temperature of 384°C. and a pressure of 1400 p.s.i.g.

The results obtained are essentially identical to those of Example V, above.

The foregoing examples are presented for the purpose of illustrating, without limitation, the catalyst and process of the present invention. It is understood that changes and variation can be made in the compositions and procedures described therein without departing from the scope of the invention as defined in the following claims.

What is claimed is:

1. A process for the vapor-phase conversion of a lower alcohol selected from the group consisting of methanol and ethanol to a higher linear primary alcohol, which process comprises:

contacting said lower alcohol, in vapor form and admixed with a carrier gas which is a mixture of hydrogen and carbon monoxide, with a solid particulate catalyst comprising: (a) between about 85 and 97 percent by weight of an inert support material comprising alumina; (b) between about 2 and 14 percent by weight of a base promoter selected from the group consisting of oxides, hydroxides, and basic salts of alkali and alkaline earth metals; and (c) between about 0.1 and 1 percent by weight of a catalyst metal which is a member of the group consisting of ruthenium, rhodium, palladium, osmium, iridium, and platinum;

said contacting being carried out at a temperature of about 200° to 400°C, under a pressure between about 1000 and 5000 psig, and at a space velocity between about 2,000 and 10,000 $hr^{-1}$.

2. The process of claim 1 wherein the catalyst support is gamma-aluminum oxide; the base promoter is a member of the group consisting of potassium hydroxide, potassium phosphate, potassium carbonate, calcium carbonate, and rubidium acetate; and the contacting is conducted at a temperature between about 300° and 400°C and at a pressure between about 1000 and 1500 psig.

3. A process for the conversion of a feed mixture of methanol and ethanol to higher linear primary alcohols, which process comprises:

contacting said feed mixture, in vapor form and admixed with a carrier gas which is a mixture of hydrogen and carbon monoxide, with a solid particulate catalyst comprising: (a) between about 85 and 97 percent by weight of an inert support material comprising alumina; (b) between about 2 and 14 percent by weight of a base promoter selected from the group consisting of oxides, hydroxides, and basic salts of alkali and alkaline earth metals; and (c) between about 0.1 and 1 percent by weight of a catalyst metal which is a member of the group consisting of ruthenium, rhodium, palladium, osmium, iridium, and platinum;

said contacting being carried out at a temperature of about 200° to 400°C, under a pressure between about 1000 and 5000 psig, and at a space velocity between about 2,000 and 10,000 $hr^{-1}$.

4. The process of claim 3 wherein the contacting is conducted at a temperature of about 300° to 400°C and at a pressure between about 1000 and 1500 psig, and wherein the catalyst support is gamma-aluminum oxide and the base promoter is a member of the group consisting of potassium hydroxide, potassium phosphate, potassium carbonate, calcium carbonate, and rubidium acetate.

5. The process of claim 4 wherein the weight ratio of methanol to ethanol in the feed mixture is between about 1:1 and 5:1; the carrier gas is synthesis gas comprising hydrogen and carbon monoxide in a molar ratio between about 1:2 and 6:1; and the catalyst is one which has been formed by impregnating gamma-aluminum oxide particles of between about 5 and 30 mesh with about 4.5 to 7.5 weight percent of the base promoter and about 0.1 to 0.5 weight percent of the catalyst metal.

6. A process for the conversion of a feed mixture of methanol and ethanol to n-propanol and n-butanal, which process comprises:

contacting said feed mixture, in vapor form and in admixture with a carrier gas, at a temperature of about 200° to 500°C, at a pressure of about 1000 to 5000 psig, and at a space velocity of about 2,000 to 10,000 $hr^{-1}$, with a particulate solid catalyst of about 5 to 30 mesh particle size and comprising: (a) about 92 to 95 weight percent gamma-aluminum oxide, (b) about 4.5 to 7.5 weight percent rubidium acetate, and (c) about 0.1 to 0.5 weight percent rhodium.

7. The process of claim 6 wherein the carrier gas is synthesis gas comprising hydrogen and carbon monoxide in a molar ratio between about 1:2 and 6:1; the weight ratio of methanol to ethanol in the feed mixture is about 1:1 to 5:1; the contacting is conducted at a temperature between about 300° and 400°C and at a pressure between about 1000 and 1500 psig; and the catalyst particles are about 10 to 20 mesh in size, have a surface area of about 100 to 400 square meters per gram, and are impregnated with said rubidium acetate and rhodium.

8. A process for the conversion of a feed mixture of methanol and ethanol to n-propanol and n-butanol, which process comprises:

contacting said feed mixture, in vapor form and in admixture with a carrier gas, at a temperature of about 200° to 500°C, at a pressure of about 1000 to 5000 psig, and at a space velocity of about 2,000 to 10,000 $hr^{-1}$, with a particulate solid catalyst of about 5 to 30 mesh particle size and comprising: (a) about 92 to 95 weight percent of gamma-aluminum oxide, (b) about 4.5 to 7.5 weight percent rubidium acetate, and (c) about 0.1 to 0.5 weight percent palladium.

9. The process of claim 8 wherein said carrier gas is synthesis gas comprising hydrogen and carbon monoxide in a molar ratio of about 1:2 to 6:1; the weight ratio of methanol to ethanol in the feed mixture is about 1:1 to 5:1; the contacting is conducted at a temperature of about 300° to 400°C and at a pressure of about 1000 to 1500 psig; and the catalyst is of about 10 to 20 mesh particle size, has a surface area of about 100 to 400 square meters per gram, and is impregnated with said rubidium acetate and palladium.

10. A process for the conversion of a feed mixture of methanol and ethanol to n-propanol and n-butanol, which process comprises:

contacting said feed mixture, in vapor form and in admixture with a carrier gas, at a temperature of about 200° to 500°C, at a pressure of about 1,000 to 5,000 psig, and at a space velocity of about 2,000 to 10,000 $hr^{-1}$, with a particulate solid catalyst of about 5 to 30 mesh particle size and comprising: (a) about 92 to 95 weight percent gamma-aluminum oxide, (b) about 4.5 to 7.5 weight percent rubidium acetate, and (c) about 0.1 to 0.5 weight percent ruthenium.

11. The process of claim 10 wherein said carrier gas is synthesis gas comprising hydrogen and carbon monoxide in a molar ratio of about 1:2 to 6:1; the weight ratio of methanol to ethanol in the feed mixture is about 1:1 to 5:1; the contacting is conducted at a temperature of about 300° to 400°C and at a pressure of about 1,000 to 1,500 psig; and the catalyst is of about 10 to 20 mesh particle size, has a surface area of about 100 to 400 square meters per gram, and is impregnated with said rubidium acetate and ruthenium.

* * * * *